United States Patent [19]

Rasmussen

[11] 4,162,557

[45] * Jul. 31, 1979

[54] PROCESS FOR TURNING A COATED CASING INSIDE OUT

[75] Inventor: Jerome J. M. Rasmussen, Burbank, Ill.

[73] Assignee: Union Carbide Corporation, New York, N.Y.

[*] Notice: The portion of the term of this patent subsequent to May 31, 1994, has been disclaimed.

[21] Appl. No.: 753,817

[22] Filed: Dec. 23, 1976

[51] Int. Cl.² .............................................. A22C 13/02
[52] U.S. Cl. .............................................. 17/45; 17/42
[58] Field of Search ............................... 17/42, 43, 45; 138/118.1; 223/39, 40, 42

[56] References Cited

U.S. PATENT DOCUMENTS

| 1,030,336 | 6/1912 | Shields | 223/39 |
| 2,961,323 | 11/1960 | Underwood et al. | 138/118.1 |
| 3,215,321 | 11/1965 | Whittemore | 223/39 |
| 3,242,524 | 3/1966 | Witzleben | 17/43 |
| 3,378,379 | 4/1968 | Shiner et al. | 138/118.1 |
| 3,594,857 | 7/1971 | Michl | 17/42 |
| 3,616,489 | 11/1971 | Voo et al. | 17/42 |
| 3,695,901 | 10/1972 | Winokur | 17/42 |
| 3,833,022 | 9/1974 | Turbak et al. | 138/118.1 |
| 3,880,058 | 4/1975 | Ichioka | 93/24 TW |
| 3,886,979 | 6/1975 | Rasmussen | 138/118.1 |
| 3,894,312 | 7/1975 | McNeill | 17/43 |
| 4,026,985 | 5/1977 | Rasmussen | 17/42 |

FOREIGN PATENT DOCUMENTS 1198988  5/1970  Fed. Rep. of Germany ............ 17/43

Primary Examiner—Louis G. Mancene
Assistant Examiner—Paul J. Hirsch
Attorney, Agent, or Firm—Cornelius F. O'Brien

[57] ABSTRACT

A process for turning a coated casing inside out comprising the steps of humidifying, if necessary, and then shirring a length of casing to produce a shirred stick. Thereafter, one end of the casing is drawn through the bore and out of the opposite end of the casing stick thereby effectively reversing the inner and outer surfaces of the casing.

18 Claims, 2 Drawing Figures

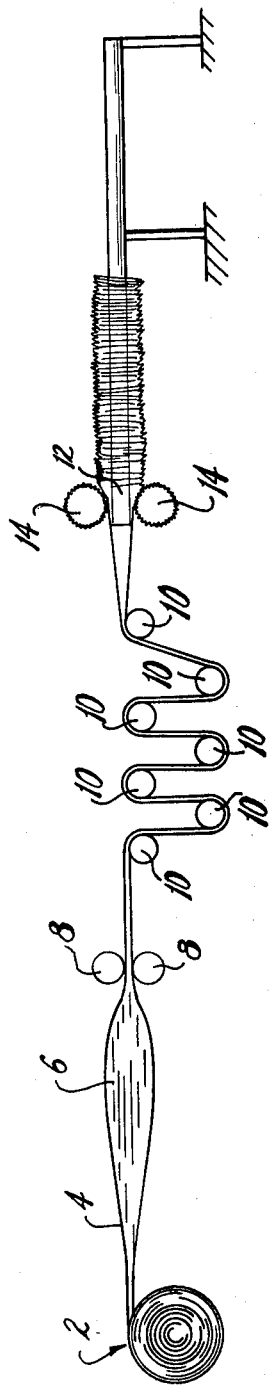
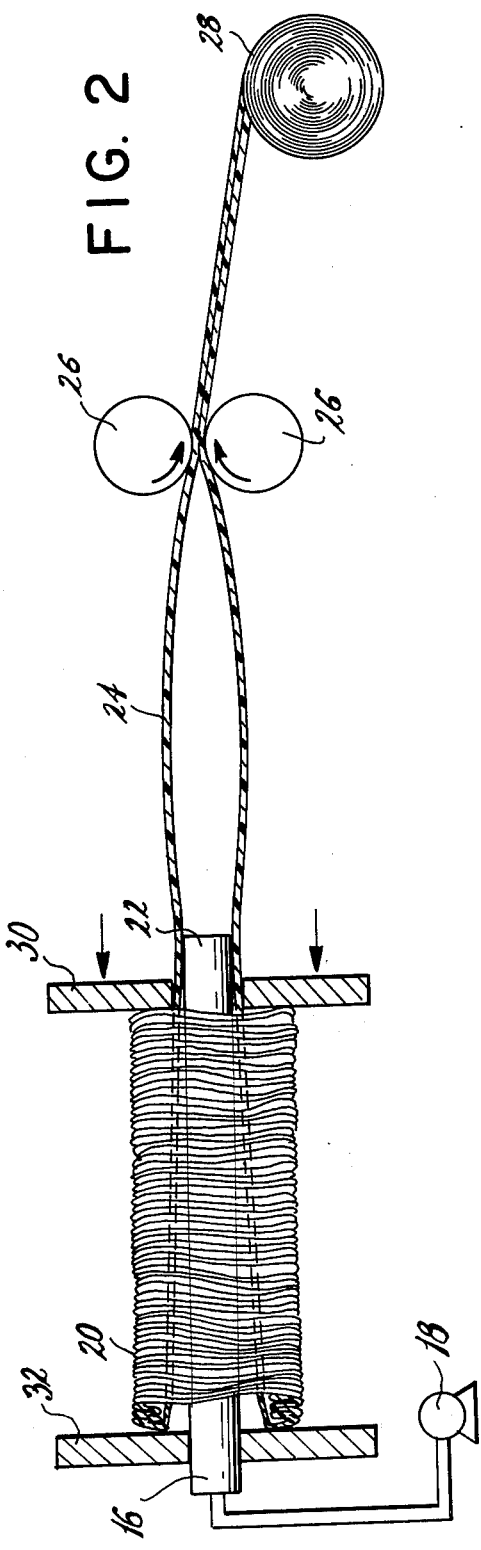

4,162,557

PROCESS FOR TURNING A COATED CASING INSIDE OUT

FIELD OF THE INVENTION

The invention relates to a process for inverting or evaginating an elongated flexible tubing, such as an externally coated fibrous food casing, so as to reverse the inner and outer surfaces of said tubing.

BACKGROUND OF THE INVENTION

There are a large number of different types of processed food products such as frankfurters, bologna, salami, liverwurst, cheese rolls, turkey rolls, and the like manufactured throughout the world from a wide range of recipes and using many different types of processing conditions. A common feature of most categories of processed food products, particularly meat products, is that the mixture of ingredients of which the processed food product is prepared, commonly called an "emulsion," is stuffed into a casing. The food product can be processed while encased in the casing, and in many cases is then stored in the casing.

Casings most generally used are synthetic casings that may be of several different types and sizes depending on the category of food product to be prepared. In general, synthetic casings are supported or unsupported materials with the supported type, commonly called "fibrous food casing," utilized in the preparation of larger sizes of products such as bologna or turkey rolls. Fibrous casing consists of a fibrous web, usually a non-woven paper, formed into a seamless tube, impregnated with viscose which is regenerated in situ.

Since there are so many differences in recipes for making processed food products, such as sausages, and such different modes of processing the different products, it is difficult to provide a casing that is acceptable for all uses. For example, a category of sausages is typified by liver sausage which is moist, relatively soft, has a substantially high fat content and is cooked, usually in hot water or steam, by the manufacturer. In this type of sausage, moisture must be retained within the emulsion and the emulsion must be protected against oxidation which causes undesirable discoloration. A suitable casing should therefore be impermeable to moisture and have a low rate of oxygen transmission. Thus various casings having a suitable coating adhered to the surface thereof are commercially available for use in such applications. Food casings such as, for example, disclosed in U.S. Pat. No. 2,961,323, are coated with materials such as a polyvinylidine chloride copolymer which coating is substantially impermeable to moisture and has how oxygen and gas transmission characteristics.

Cellulosic food casings used in the sausage industry are multifunctional in that they can be used as containers during the processing of the product and as protective wrapping for the finished product. The casing is often removed from the sausage after processing and the sausage sliced and repacked into smaller units. When the casing is removed from the meat mass, there is frequently a tendency for some meat to adhere to the casing and be torn from the sausage with the casing, thereby causing surface marring of the sausage. The marring may range from minor scuffing to severe scarring depending upon the type of meat product and conditions of processing and peeling. Thus in the use of this type casing it may be advantageous to have an internally applied coating to the casing that will enable the casing to be easily removed from the meat mass encased therein.

In other applications it may be desirable to have a different type of coating applied to the inner surface of a fibrous casing. For example, in stuffing sausage emulsion containing a substantially high fat content into a cellulose hydrate casing, it may be desirable to have a vinylidene resin coating applied on the inner surface of the casing so that when the sausage emulsion is processed, the outer surface of the casing after being wet can dry and shrink thus encasing the sausage properly to provide a plump, attractively shaped product.

For other applications, it may be desirable to have the internal surface of a casing coated with a moisture proof layer of polyvinyl chloride, polyolefins and substituted polyolefins as well as vinyls, polyesters, nylons, and suitable copolymers of the above. There are many methods presently available for internally coating a tubing as, for example, the "slugging" technique described in U.S. Pat. No. 3,378,379. However, the primary disadvantage of applying a coating to the internal surface of a tubing is that it is very difficult to control the quality and quantity of the coating. Contrary to this, the knowledge available in the external coating art permits the use of various coating materials to be applied to the external surface of tubing under more regulated conditions so as to control the quality and quantity of the coating being applied. Accordingly, it is known in the art that coated flexible tubing, such as externally coated casings, can be turned inside out so as to position the coated surface on the interior of the tubing using devices as disclosed in U.S. Pat. Nos. 3,242,524 and 3,894,312.

It is the primary object of the present invention to provide a process for evaginating fibrous and cellulose tubing so as to reverse the inner and outer surfaces of said tubing.

Another object of the invention is to provide a process for easily turning fibrous or cellulosic tubing inside out without damaging such tubing.

Another object of the invention is to provide a process whereby coated fibrous or cellulosic tubing is humidified, shirred, and then turned inside out by drawing one end of the tubing through the bore of the shirred tubing out through the opposite end.

SUMMARY OF THE INVENTION

The invention relates to a process for turning an elongated flexible tubing inside out which comprises:

(a) humidifying a length of flexible tubing to at least 8 percent moisture level based on total weight of the tubing;

(b) shirring the humid length of flexible tubing to form a shirred stick;

(c) deshirring and everting the flexible tubing of the shirred stick by drawing one end of the tubing through the bore of the shirred stick and out through the opposite end;

(d) inflating the everting deshirred tubing;

(e) flattening the everting inflated tubing; and (f) winding the everting flattened tubing into a supply type roll or shirring the inverted flattened tubing to form a shirred stick.

It is also within the scope of this invention to delete step (a) for sufficiently flexible tubing and/or to replace steps (d) through (f) with the following step:

(d') shirring the everted tubing to form a shirred stick.

Thus in accordance with the former process, the inverted tubing can be wound into a supply type roll while in the latter process, the inverted tubing can be formed into shirred sticks for use with conventional stuffing apparatus.

The tubing or tubular food casings suitable for use in preparing shirred and compressed tubular casing of the present invention may be flexible, seamless tubing formed of regenerated cellulose, cellulose ethers such as the ethyl, propyl, hydroxy, alkyl and like ethers, proteins, carbohydrates, collagens, alginates, starches as well as other synthetic or artificial materials. Tubings reinforced with fibers such as, for example, those employed in the production of yoshino paper, rice paper and the like, hemp, rayon, flax, nylon, polyethylene terephthalate and the like are most advantageously employed in applications requiring large diameter tubular food casings.

The tubular casings can be made by any known process such as, for example, by the cuprammonium, deacetylation of cellulose acetate, viscose, denitration of cellulose nitrate processes or extrusion of appropriate compositions. Tubular casings reinforced with fibers can be made by the method and apparatus described, for example, in U.S. Pat. Nos. 2,105,273; 2,144,889; 2,910,380; 3,135,613; and 3,433,663.

Coating materials suitable for use as coatings with tubular food casings are well known and may be prepared, for example, from polyvinylidene chloride resin copolymers, polyethylene and other polyolefin resins, polyester resins, nylon, polyurethane resins and suitable combinations thereof. The coating is applied to the exterior surface of the casing whereupon the casing is then turned inside out using the process of this invention.

The use and type of a primer on the surface of casing employed prior to application of the coating or applying the coating directly to the surface of the casing will depend on the type of coating to be employed, the degree of adhesion required and the service requirements for the casing. It is known, for example, that various cationic thermosetting resins are advantageously employed as primers for enhancing adhesion of certain polyvinylidene chloride copolymer coatings to cellulosic casing surfaces. Exemplary of polyvinylidene chloride copolymer resins coatings advantageously employed with tubular food casings and the method of application, may be found, for example, in the disclosures of U.S. Pat. Nos. 2,961,323, 3,328,330 and 3,369,911.

Large diameter flexible synthetic tubular casings are, in general, supplied to the food processor in various lengths and in a flattened condition, as produced by the first above-described process. Smaller diameter casings usually supplied in long lengths, such as for example, 55 feet to 160 feet or more, are generally shirred and compressed to produce what is commonly termed in the art "shirred casing sticks" of from about 9 inches to 24 inches in length. The convenience in handling made possible by shirring long lengths of tubular casing makes it desirable to employ this method for as many types and sizes of tubular casing as possible. This type of shirred casing stick can be produced by the second above-described process.

Another characteristic found to be essential in the preparation of the casings of the present invention from coated tubular casings is the moisture content of the tubular casing. The moisture content of the tubular casing must be at least about 8% by weight and preferably between about 10 and 20% in order that it may be mechanically and loosely shirred without damage thereto and then easily and safely inturned or inverted as disclosed herein.

The desired moisture content of the coated tubular casing may be attained by any of a number of well known methods such as the "slugging" technique, by steam or vapor humidification in an inflated condition, or by internal spraying of inflated casing. It is necessary to humidify the casing to allow shirring of the casing and then inversion of the casing without damage thereto. Specifically, the water from the humidification step of the process acts as a plasticizer to permit shirring and inversion of the casing without damage.

Lightly shirred and compressed coated tubular casing sticks (step b of the subject invention) may be prepared by shirring and compressing coated tubular casing having the moisture content wherein disclosed employing the conventional shirring machines and methods as disclosed, for example, in U.S. Pat. Nos. 2,983,949, 2,984,574 and 3,397,069.

The casing should be loosely shirred prior to turning the casing inside out because if the casing is tightly shirred, it may sustain damage during the inverting step. It is well within the skill of a technician to determine the proper compactness of the shirred stick depending on the casing material to be evaginated.

BRIEF DESCRIPTION OF THE DRAWING

FIG. 1 is a schematic view of an apparatus for humidifying and then shirring a casing length to produce a shirred stick.

FIG. 2 is a schematic view of an apparatus for deshirring, evaginating, inflating and then winding a casing into a supply roll.

FIG. 1 shows a supply roll 2 of flexible tubular casing 4 in which, using the "slugging" technique, water 6 was placed within the initial segment of casing dispensed from the roll 2. The water 6 is added in a sufficient amount and the segment of the casing 4 is contacted by the water 6 for a time period sufficient to humidify the casing to at least a 10 percent moisture level. Thereafter casing 4 is fed between squeeze rolls 8 which minimize any water carry over. The casing then passes over additional spaced apart rollers 10 so as to dry the casing and equilibrate the casing to a moisture content of preferably between about 12 percent and 20 percent moisture level. The humid casing is then fed over a mandrel 12 where it is loosely shirred by shirring gears 14 as generally disclosed in U.S. Pat. Nos. 2,983,949, 2,984,574 and 3,397,069.

The loosely shirred casing stick is then removed from the shirring gears 14 and placed on a hollow mandrel 16 as shown in FIG. 2. Coupled to one end of mandrel 16 is an air supply pump 18. The end of the loosely shirred casing 20 proximal the air supply end of mandrel 16 is deshirred and fed through the bore of the shirred stick 20 and transported over the opposite end 22 of the mandrel 16 where the casing becomes inflated through activation of the air pump 18. The inflated inverted casing 24 is then flattened between squeeze rollers 26 whereupon it is then wound into a supply type roll 28.

To prevent the shirred casing stick 20 from slipping off mandrel 16, a support member 30 could be disposed at the end of the casing stock 20. The support member 30 could also be bias in a conventional manner (not shown), such as by air or spring means, so as to continually supply a support for the casing stick 20 as it is being deshirred. In addition, a second support member 32 could be disposed at the opposite end of the shirred casing stick 20 thereby maintaining and fixing said casing stick 20 between support members 30 and 32. In this arrangement, as the end of the casing stick 20 is deshirred against support member 32 and fed through the bore of the stick 20, the length of the stick will become progressively smaller and the support 30 will be bias to the left as shown by the arrows in FIG. 2 to maintain contact with and support for the casing stick. This support arrangement will effectively prevent the casing stick 20 from slipping off the mandrel 16.

As discussed above, the inverted casing 20 being disposed over the end 22 of mandrel 16 could be fed to shirring gears 14 as shown in FIG. 1 to produce a shirred stick of the inverted casing.

EXAMPLE

Using the techniques shown in FIGS. 1 and 2, a 55 foot length of PVDC coated fibrous casing (sized 6.1 cm in diameter) was slug humidified to a moisture level of between 10 and 12%. After equilibration at this moisture level, the casing was shirred on a conventional shirring machine. The end of the shirred casing was then deshirred and inturned into the bore of the casing whereupon it was fed out the opposite end of the casing. It was then inflated in the manner discussed in conjunction with FIG. 2. The inflated, inverted casing was then flattened and wound in a roll thus demonstrating the benefit of this invention in turning coated casing inside out.

The invention being thus described, it will be obvious that the same may be varied in many ways. Such variations are not to be regarded as a departure from the spirit and scope of the invention, but all such modifications are intended to be included within the scope of the following claims.

What is claimed is:

1. A process for turning an elongated flexible tubing inside out which comprises:
    (a) humdifying a length of flexible tubing to at least 8 percent moisture level based on the total weight of the tubing;
    (b) shirring the humid length of flexible tubing to form a shirred stick;
    (c) deshirring and everting the flexible tubing of the shirred stick by drawing one end of the tubing through the bore of the shirred stick and out through the opposite end;
    (d) inflating the everted deshirred tubing as it is exiting from the stick bore; and
    (e) flattening the everted, inflated tubing.

2. The process of claim 1 wherein the following step is added: (f) winding the everted flattened tubing into a roll.

3. The process of claim 1 wherein the following step is added: (f) shirring the everted flattened tubing to form a shirred stick.

4. The process of claim 1 wherein in step (a) the flexible tubing is humidified between about 10% and 20% moisture level.

5. The process of claim 1 wherein the flexible tubing is a coated fibrous casing.

6. The process of claim 5 wherein in step (a) the flexible tubing is humidified between about 10% and 20% moisture level.

7. The process of claim 1 wherein the flexible tubing is a coated cellulose casing.

8. The process of claim 7 wherein in step (a) the flexible tubing is humidified between about 10% and 20% moisture level.

9. A process for turning an elongated flexible tubing inside out which comprises:
    (a) humidifying a length of flexible tubing to at least 8 percent moisture level based on the total weight of the tubing;
    (b) shirring the humid length of flexible tubing to form a shirred stick;
    (c) deshirring and everting the flexible tubing of the shirred stick by drawing one end of the tubing through the bore of the shirred stick and out through the opposite end; and
    (d) shirring the everted deshirred tubing to form a shirred tubing stick.

10. The process of claim 9 wherein in step (a) the flexible tubing is humidified between about 10% and 20% moisture level.

11. The process of claim 9 wherein the flexible tubing is a coated fibrous casing.

12. The process of claim 11 wherein in step (a) the flexible tubing is humidified between about 10% and 20% moisture level.

13. The process of claim 9 wherein the flexible tubing is a coated cellulose casing.

14. The process of claim 13 wherein in step (a) the flexible tubing is humidified between about 10% and 20% moisture level.

15. A process for turning an elongated flexible food casing inside out which comprises:
    (a) shirring a length of flexible food casing to form a shirred stick;
    (b) deshirring and everting the flexible food casing of the shirred stick by drawing one end of the food casing through the bore of the shirred stick and out through the opposite end;
    (c) inflating the everted deshirred food casing; and
    (d) flattening the everted inflated food casing.

16. The process of claim 15 wherein the following step is added:
    (e) winding the everted, flattened food casing into a roll.

17. The process of claim 15 wherein the following step is added:
    (e) shirring the everted flattened food casing to form a shirred stick.

18. A process for turning an elongated flexible food casing inside out which comprises:
    (a) shirring a length of flexible food casing to form a shirred stick;
    (b) deshirring and everting the flexible food casing of the shirred stick by drawing one end of the food casing through the bore of the shirred stick and out through the opposite end; and
    (c) shirring the everted and deschirred food casing to form a shirred food casing stick.

* * * * *